United States Patent [19]

Trattner

[11] 4,317,107
[45] Feb. 23, 1982

[54] AUDIBLE VACUUM DETECTOR

[75] Inventor: Burton C. Trattner, Coram, N.Y.

[73] Assignee: Harvey-Westbury Corp., Westbury, N.Y.

[21] Appl. No.: 89,407

[22] Filed: Oct. 30, 1979

[51] Int. Cl.³ .................... B60Q 5/00; G08B 21/00
[52] U.S. Cl. ................................. 340/52 R; 73/115; 123/198 R; 200/82 R; 200/82 D; 340/626
[58] Field of Search ............ 340/626, 670, 689, 52 R, 340/601, 611; 200/81 R, 81.9 R, 82 R, 82 D, 82 E, 83 R, 83 S, 84 R; 73/113, 114, 115, 308, 313, 301; 123/198 R, 198 D, 198 E

[56] References Cited

U.S. PATENT DOCUMENTS

| | | | |
|---|---|---|---|
| 354,508 | 12/1886 | Fraleigh | 73/308 |
| 1,149,042 | 8/1915 | Goldstein et al. | 340/670 |
| 1,179,486 | 4/1916 | Wight | 73/313 X |
| 2,253,425 | 8/1941 | Garland | 123/198 D X |
| 3,909,778 | 9/1975 | Maria et al. | 340/52 R |
| 3,922,909 | 12/1975 | Dixson et al. | 73/115 |

Primary Examiner—John W. Caldwell, Sr.
Assistant Examiner—Daniel Myer
Attorney, Agent, or Firm—Weinstein & Sutton

[57] ABSTRACT

A detector for providing an audible indication of the vacuum condition for use in promoting the economic operation of a vehicle including a vacuum detector for detecting the magnitude of the vacuum condition in the manifold vacuum line of a vehicle to effect a switch closure which energizes an audible alarm. The vacuum detector comprises a piston reciprocally mounted within a piston chamber and movable responsive to changes in vacuum. A piston rod is arranged between combination switch and guide means for maintaining the axial alignment of the piston rod and for cooperating with conductive means arranged along the piston rod for establishing a conductive path for energizing the audible alarm when a predetermined vacuum condition is present. The contact design provides automatic silencing of the alarm when the engine is turned off or upon demand of engine power beyond a predetermined value. The small size allows for an out-of-sight dashboard mount without affecting operator recognition of the alarm. A piston controlled vacuum-operated audible alarm may be substituted for the battery operated unit.

18 Claims, 12 Drawing Figures

AUDIBLE VACUUM DETECTOR

BACKGROUND OF THE INVENTION

The present invention relates to vacuum measuring devices and more particularly to a novel audible vacuum gauge for providing a signal representative of one or more vacuum conditions to alert the driver of the vehicle of the presence of such conditions.

Vehicles such as cars, trucks and the like consume significant amounts of fuel relative to the total amount of fuel consumed for all purposes. As a result, numerous efforts have been undertaken to design such vehicles with a view toward optimizing the economic use of fuel.

Most present day engines employ fuel supply systems having primary and secondary fuel supplies, such that, when the vacuum level drops and renders the primary system unable to supply fuel for additional engine power, the secondary system provides an added measure of fuel to accommodate the requirement for added power. The activation of the secondary system is wasteful of fuel and should normally be avoided.

Automotive experts agree that a very useful indicator of the operation of a vehicle in a fuel efficient manner is the vacuum gauge. Vacuum level is a function of engine r.p.m. and throttle opening such that vacuum level increases with increasing engine r.p.m. and increases with reductions in throttle opening. For example, when the vacuum in the engine manifold of a piston-driven engine drops below a predetermined value, this is an indication that fuel is being consumed in an inefficient manner. As a result, it is advantageous for drivers to observe their vacuum gauges with an effort to maintain the gauge reading within a preferred range to the extent that it is practical for the driver to do so, there being certain situations which, due to the prevailing conditions, such as an emergency condition or a rapid passing condition, is much more important than the short-term effort to utilize fuel in an efficient manner.

Operating a vehicle with a view towards obtaining most efficient use of the fuel consumed necessitates substantially constant observation of the vacuum gauge, and such an effort can be distracting and quite tedious. In addition, movement of the eyes away from the road is potentially dangerous. Placing an instrument upon the dashboard obstructs the view and contributes to dashboard clutter.

It thus becomes advantageous to provide an instrument for indicating the vacuum condition, which instrument is capable of providing a driver with the indication that he is either in or out of a preferred range of vacuum value without the necessity for the driver constantly diverting his attention from the road ahead in order to view the instrument.

BRIEF DESCRIPTION OF THE INVENTION

The present invention is characterized by providing a vacuum gauge for producing an audible alarm when a selectible predetermined vacuum condition is exceeded.

The invention utilizes a line which is connected between the vacuum sensing means and the manifold vacuum line in order to energize an audible alarm when the vacuum condition setting selected by the driver is no longer being maintained.

During operation over a substantially normal range, the audible alarm will persist as long as the vacuum condition indicative of inefficient fuel use persists, providing the driver with the further indication that whatever remedial action he has taken has been insufficient to bring the vacuum condition above the preferred vacuum threshold level, and alternatively advising the driver that the remedial steps taken by the driver have been effective in restoring the desired vacuum condition when the alarm is silenced.

In the preferred embodiment, a driver may select one of a plurality of threshold settings depending upon the degree of fuel burning efficiency the driver wishes to strive for.

The vacuum sensor is of a highly simplified and yet novel design which greatly simplifies calibration of the vacuum sensor and also provides a simplified switch assembly cooperating with the vacuum sensor to yield a rugged, reliable device.

The vacuum sensor comprises a housing having a reciprocally mounted piston arranged within said housing and bias means for urging said piston in a first direction. The housing is provided with an opening for communicating with the manifold vacuum line of an engine manifold to create a vacuum condition to one side of the piston. The opposite side of the piston is maintained at atmospheric pressure such that the pressure differential across the piston results in movement of the piston in the direction opposite the force exerted by said bias means upon the piston.

A piston rod is secured to the piston and extends outwardly from said housing. At least one pair of resilient contacts are arranged to embrace the piston rod which makes slidable engagement with the contacts, said contacts thereby serving to maintain the piston rod in axial alignment and further serving as a pair of contact terminals which are adapted to be bridged by a conductive member secured to said piston rod when a predetermined vacuum condition is detected.

A plurality of selectible conditions may be obtained by providing a number of independent contact sets arranged at axially-spaced distances along the path of movement of said piston rod whereby a contact closure is established when the conductive member secured to the said piston rod bridges one of the contact sets.

Fine adjustment of the vacuum sensing means is accomplished simply by adjusting the axial alignment of the piston housing relative to the aforesaid resilient contacts which fully compensates for any deviations in sensitivity of vacuum sensing device for an ideal value.

In an alternative embodiment, the electrical system is replaced by an air operated audible alarm which is activated when the piston moves to a predetermined position responsive to the vacuum condition to divert some of the vacuum to an air operated vibrating reed which provides an audible alarm.

The audible vacuum gauge is simple, lightweight and quite compact and is further characterized by its ease of installation within a vehicle in a position which does not obstruct driver vision or contribute to dashboard clutter.

OBJECTS OF THE INVENTION AND BRIEF DESCRIPTION OF THE FIGURES

It is, therefore, one object of the present invention to provide an audible gauge for providing an audible alarm in the presence of a predetermined vacuum condition.

Still another object of the present invention is to provide a novel vacuum gauge with use with automobiles and the like comprised of a piston mounted within an enclosure and responsive to the vacuum condition of an engine for moving a contact bearing piston rod relative to a pair of switch terminals for establishing a bridging condition when a predetermined vacuum condition is achieved.

Still another object of the present invention is to provide a novel vacuum sensing device including a piston rod movable along its longitudinal axis responsive to vacuum changes sensed by the piston and including resilient stationary contact members engaging the piston rod for maintaining the piston rod in axial alignment as it slidably engages said embracing contacts and which further cooperate with a bridging contact on said piston rod for energizing an alarm means when the bridging contact secured to said piston rod bridges said stationary contacts.

Still another object of the present invention is to provide an audible alarm actuated by the vacuum in response to the movement of a vacuum sensitive member.

The above, as well as other objects of the present invention, will become apparent when reading the accompanying description of drawings in which.

DETAILED DESCRIPTION OF THE INVENTION

Figure 1:
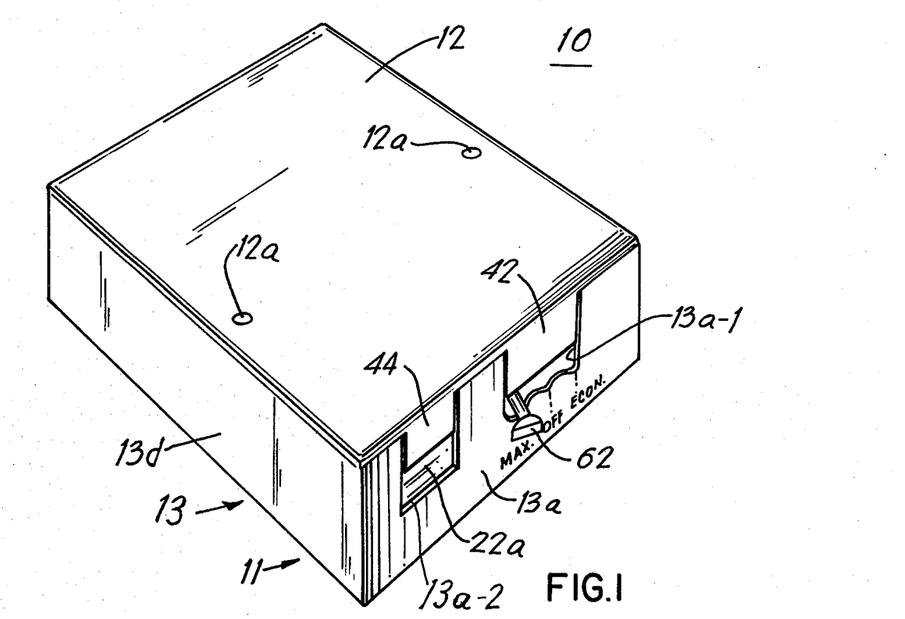
FIG. 1 is a perspective view of an audible vacuum gauge embodying the principles of the present invention and showing the top, front and left-hand sides of the housing therefor.
Figure 2:
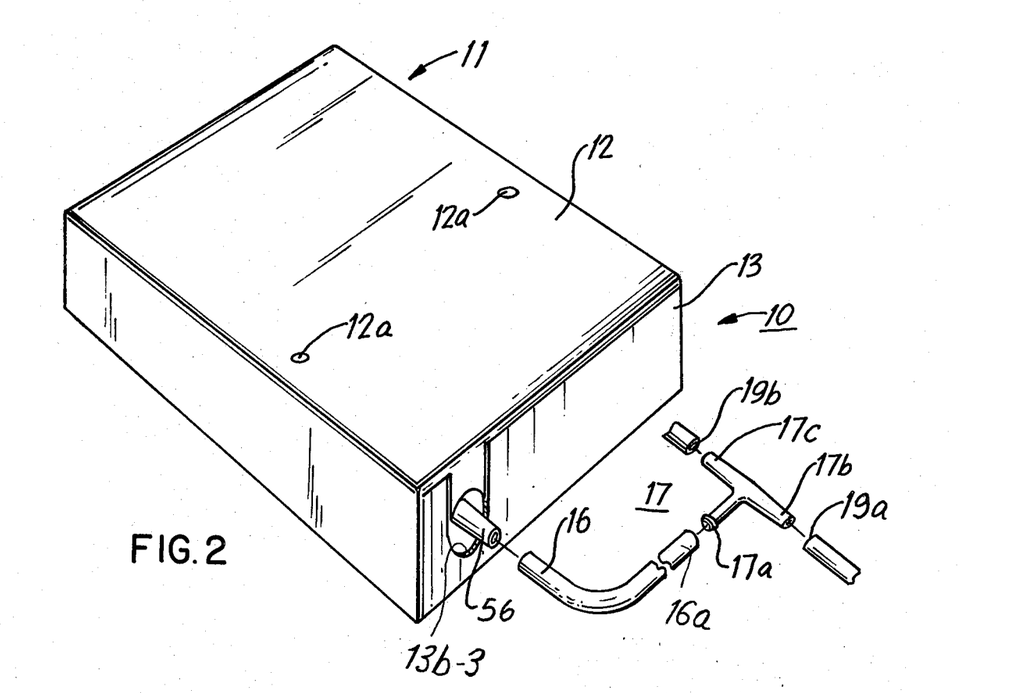
FIG. 2 is a perspective view showing the top, rear and right-hand sides of the housing in FIG. 1.
Figure 3:
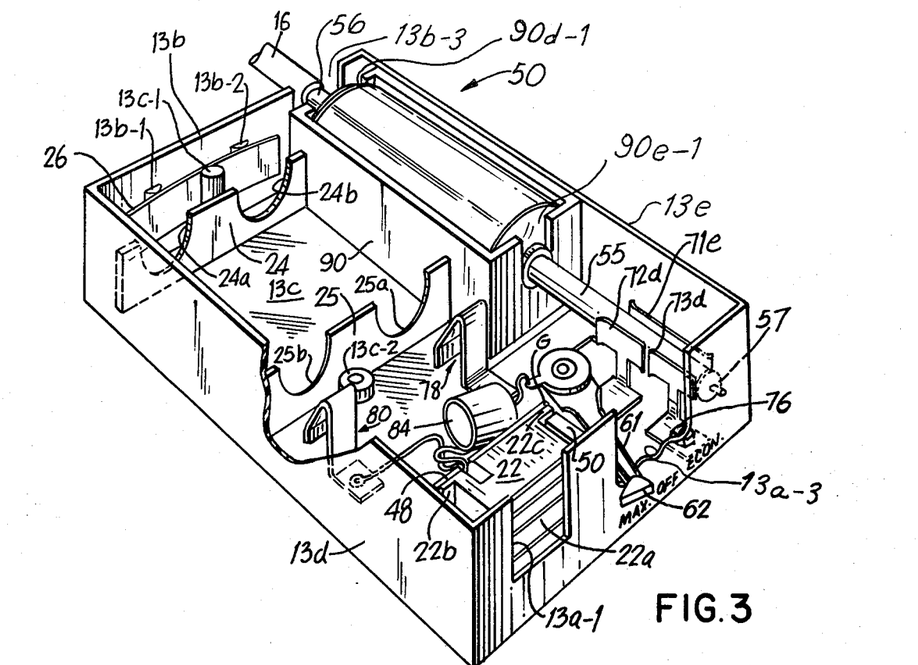
FIG. 3 is a perspective view showing the interior of one of the housing members of the housing shown in FIGS. 1 and 2.
Figures 4, 8A:
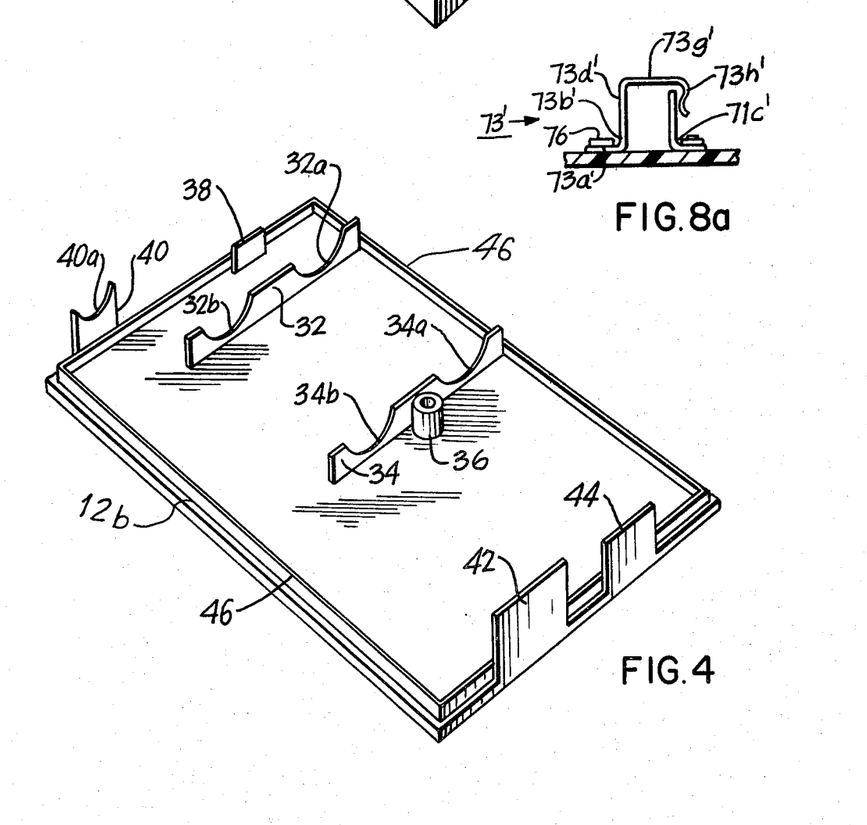
FIG. 4 is a perspective view showing the interior of the remaining housing member of the housing assembly shown in FIGS. 1 and 2.
FIG. 8a shows an elevational view of a modified contact/guide member.
Figure 7:
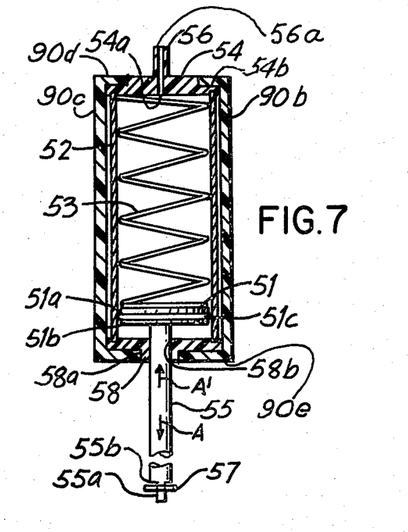
FIG. 7 shows a detailed top-plan view, partially sectionalized, of the vacuum sensing assembly of FIG. 3.

An audible vacuum gauge 10, designed in accordance with the principles of the present invention, is shown in FIGS. 1 and 2 and comprises a housing 11 having a lid or cover member 12 shown best in FIG. 4 cooperating with a bottom or tray member 13 shown best in FIG. 3, which members are assembled to form the box-like enclosure 11. The vacuum sensing assembly 50, to be more fully described in conjunction with the detailed view shown in FIG. 7, is provided with a hollow projecting nozzle 56 shown in FIG. 2 as extending beyond the rear surface of housing 11, and adapted to be connected to a flexible rubber or rubber-like hose 16. The opposite end of hose 16 is adapted to be connected to a T-connector 17 whose arm 17a is force-fitted into the free end 16a of hose 16. The manifold vacuum line 19 of an automobile engine is cut apart to form two cooperating ends 19a and 19b which are adapted to have the ends 17b and 17c of T-connector 17 force-fitted into the ends 19a and 19b of the manifold line, whereby T-connector 17 serves to maintain the integrity of the manifold vacuum line 19 and to provide a coupling of the vacuum condition to the vacuum sensing means 50 through its hollow projecting nozzle 56.

Figure 5:
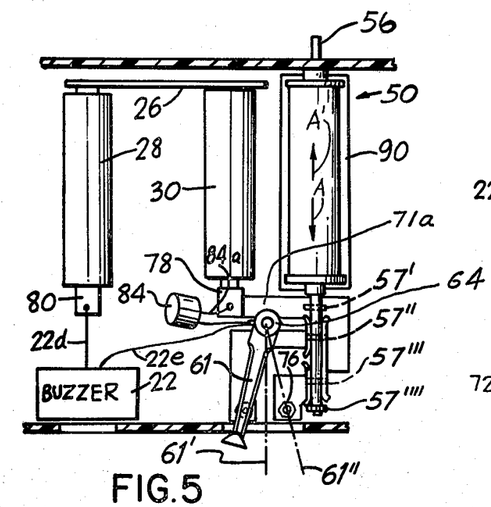
FIG. 5 is a simplified partially diagrammatical top plan view of the electrical circuit components of the audible vacuum gauge of FIG. 3.
Figure 6:
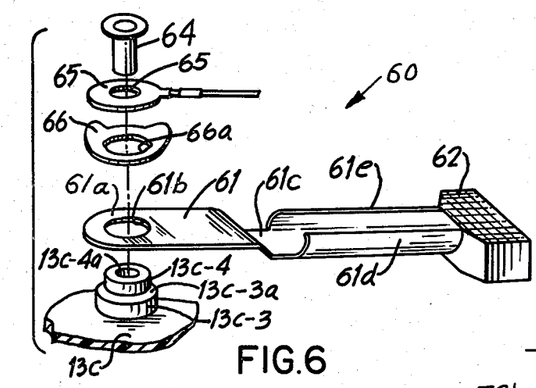
FIG. 6 shows a perspective view of the adjustable switch-arm assembly shown in FIG. 5.
Figure 6A:
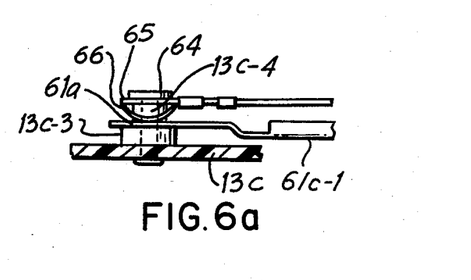
FIG. 6a is an elevational view of the switcharm assembly of FIG. 6.

A switch arm 61 to be described in greater detail in conjunction with FIGS. 5, 6 and 6a, has a handle portion 62 extending from the front face 13a of the assembled housing 11 as shown in FIG. 1 to facilitate manipulation of the switch for selecting the particular vacuum threshold condition to be detected.

An audible alarm unit which in the present invention is preferably a buzzer 22 is arranged within housing member 13 in a manner to be more fully described, so that its louvred front surface 22a is positioned immediately behind a substantially U-shaped slot 13a provided in housing member 13 in order to freely communicate the alarm from the interior of housing 11 to the cabin of the automobile.

The cover member 12 is provided with a pair of mounting holes 12a receiving fastening members or the like in order to preferably affix the housing assembly 11 to the underside of the dashboard (not shown) of a vehicle, for example.

The tray portion 13 shown in FIG. 3 is provided with first and second cradles 24 and 25 each having a pair of semicircular grooves 24a, 24b and 25a, 25b for receiving and supporting a battery. Rear wall 13b of casing 13 is provided with a pair of projections 13b-1 and 13b-2. A projection 13c-1 integral with and extending upwardly from floor 13c of housing half 13 is positioned between projections 13b-1 and 13b-2 and cooperates with these projections to maintain a conductive resilient leaf-spring element 26 in the position shown in FIG. 3 to provide a conductive electric path between the negative terminal 28a of battery 28 and the positive terminal 30a of battery 30, as shown in FIG. 5.

The rear wall 13b is provided with a substantially U-shaped slot 13b-3 through which the nozzle end 56 of the vacuum sensor assembly 50 extends for connection to the coupling hose 16 in the manner shown best in FIG. 2.

Base portion 13c is provided with an integral projection 13c-2 which extends upwardly from base portion 13c and which is provided with a tapped opening. This tapped opening cooperates with an elongated hollow cylindrical-shaped projection 36 extending upwardly from and integral with base portion 12a of housing half (i.e. lid) 12 as shown best in FIG. 4. Cradles 32 and 34 are provided with semicircular shaped cutouts 32a and 32b, 34a and 34b, which cutouts cooperate with the semicircular shaped cutouts 24a, 24b, 25a and 25b of cradles 24 and 25 respectively, for embracing the batteries 28 and 30 shown in FIG. 5 in order to prevent the batteries from experiencing any movement within the housing 11 when the housing halves 12 and 13 are assembled together.

Integral projection 36 provided on surface 12a is adapted to receive a threaded fastener (not shown) and extends through cylindrical projection 36 to be received by and threadedly engaged in a tapped opening in integral projection 13c-2 provided in floor 13c. The combined height of projections 13c-2 and 36 is equal the height between floor 13c and surface 12a so as to provide a tight fit between housing halves 12 and 13 while preventing the center of the housing halves from bending inwardly.

Projections 42 and 44 integral with housing half 12 extend upwardly as shown in FIG. 4 and are adapted to cooperate with slots 13a-2 and 13a-1 forming the openings through which switch arm 61 extends and behind which buzzer 22 is positioned respectively.

The rear end of housing half 12 is provided with a projection 40 having a semicircular-shaped free end 40a, and an integral projection 38. Projection 40 is adapted to fit into slot 13c-3 to partially encircle the connecting nozzle 56 as shown best in FIG. 2. Projection 38 is a locating projection and extends along the interior surface of wall 13b. A rectangular-shaped projection 46 extends about the periphery of housing half 12 and is set in from the free edge thereof so as to form a shoulder 12b. When housing halves 12 and 13 are fitted together, projection 46 telescopes into the interior of housing portion 13 and shoulder 12b rests upon the upper edges sidewalls 13a, 13b, 13d and 13e to cover the open end of housing half 13. Projection 38 rests upon the top edge of contact member 26 and is positioned between wall 13b and projection 13c-1.

Housing half 13 is further provided with a pair of projections 48 and 50 arranged substantially at right angles relative to one another and forming a box-like region for receiving buzzer 22 which has a housing 22a provided with a pair of flanges 22b, and 22c. Buzzer 22 fits into the compartment cooperatively formed by sidewalls 13a and 13d and projections 48 and 50. Flange 22c is force-fitted into the gap G between projections 48 and 50 to maintain the buzzer 22 in position.

Considering FIGS. 3 and 7, the vacuum sensing device 50 is comprised of the box-shaped housing 90 with an open top and defined by base portion 90a and upright sidewalls 90b through 90e. Sidewalls 90d and 90e are each provided with a substantially U-shaped slot 90d-1, and 90e-1. The box-like member 90 is adapted to slidably fit between sidewall 13d and the right-hand edges of cradle members 24 and 25 so that U-shaped slot 90d-1 is substantially in alignment with U-shaped slot 13c-3 in rear wall 13c.

The vacuum sensing assembly 50 is further comprised of a hollow cylindrical housing 52 fitted with circular-shaped end caps 54 and 58. Connecting nozzle 56 forms an integral part of end cap 54 and an opening 56a extends through nozzle 56 and communicates with an opening 54a in end cap 54 so as to provide communication between connecting hose 16 and the interior of hollow cylindrical member 52 through openings 56a and 54a. A piston member 51 is arranged within cylinder 52 and is adapted to reciprocate therein. An elongated helical spring 53 is arranged within hollow cylinder 52 and has its upper end bearing against the interior surface of end cap 54 and its opposite end bearing against the adjacent surface of piston 51 so as to urge piston 51 and piston rod 55 connected thereto in the direction shown by arrow A. End cap 58 is provided with an axially aligned opening 58b through which piston rod 55 extends. A grease impregnated leather washer 51c is sandwiched between piston halves 51a and 51b and extends beyond the periphery of piston 51 for providing a substantially air-tight sliding seal between piston 51 and the interior surface of cylinder 52. The free end of piston rod 55 is provided with a reduced diameter projection 55a. A metal washer 57 formed of material having good conductivity is force-fitted onto projection 55a and rests upon shoulder 55b of piston rod 55. The diameter of washer 57 is greater than the diameter of piston rod 55 and serves as a bridging member between contact 71 and either contact 72 or 73, shown in FIG. 8.

End caps 54 and 58 are provided with shoulders 54b and 58a respectively for interfitting with the sidewalls of the U-shaped slots 90d-1 and 90e-1 of the end walls 90d and 90e provided in box-like member 90 so as to provide a good force-fit between the vacuum sensing arrangement and the slide member 90 into which the vacuum sensing assembly 50 is mounted.

Figure 8:
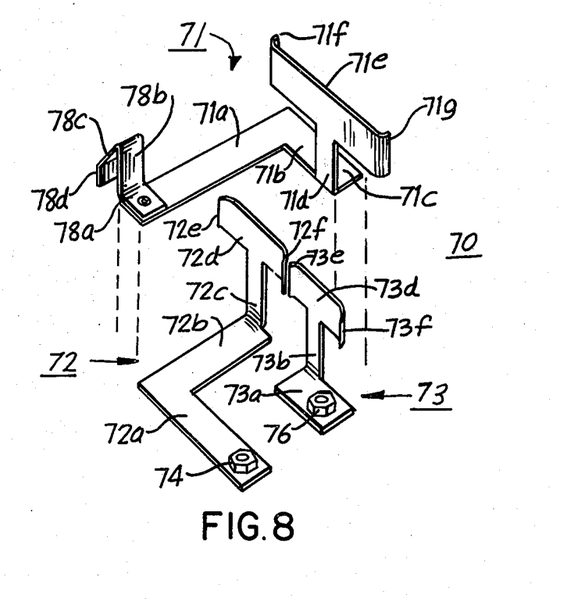
FIG. 8 is a detailed perspective view of the combination contact/guide members shown in FIG. 3.

Positioned forwardly of box-like member 90 and behind front wall 13a in housing half 13 is a contact assembly which, as can best be seen in FIG. 8, is comprised of three major contact members 71, 72 and 73. Contact member 71 is substantially L-shaped and is provided with a first arm 71a extending in front of and substantially parallel to sidewall 90e in box-like member 90. Arm 71b extends along and is parallel to the interior of sidewall 13b. A third integral arm portion 71c extends inwardly from and is substantially perpendicular to sidewall 13e. The free end thereof is bent upwardly to form a vertically aligned portion 71d of substantially narrow width. The upper end of vertically aligned portion 71d widens significantly into an elongated combination contact/guide portion 71e which extends substantially parallel to sidewall 13e. The free ends of portion 71e are bent toward sidewall 13e to form curved ends 71f and 71g to facilitate movement of the metallic washer 57 along one major surface of contact member 71e, in a manner to be more fully described.

A second contact 72 having a substantially L-shaped configuration is provided with a first contact portion 72a integral with a second contact portion 72b arranged at right angles thereto. The opposite end of contact portion 72b is bent upwardly to form narrow vertically aligned contact portion 72c which widens to contact portion 72d having curved ends 72e and 72f which are bent away from sidewall 13e. Contacts 71 and 72 are arranged along the surface of base portion 13c and secured thereto by suitable fastening means such as rivets. Contact 72 is provided with a combination fastener and contact button 74 which secures contact 72 to housing half 13 and which cooperates with settable contact arm 61 in a manner to be more fully described herein.

A third contact member 73 is provided with a contact portion 73a arranged along the surface of base portion 13c and having a bent portion 73b extending vertically upward and widening significantly into contact portion 73d having curved ends 73e and 73f which are bent away from sidewall 13e. A combination fastener and contact button 76 secures contact 73 to housing half 13 and provides means for electrically engaging contact arm 60, as will be more fully described.

The free end of contact portion 71a of contact member 71 has a resilient battery clip 78 connected thereto whereby clip portion 78a rests upon the upper surface of the free end of contact portion 71a in the manner shown. Clip 78 is bent upwardly to form vertically aligned portion 78b, is bent downwardly to form diagonally aligned portion 78c and is further bent to form the vertically aligned free end 78d. Surface 78c acts as a guiding surface for guiding a battery between clip 78 and the aforementioned conductive leaf-like member 26. The free end portion 78d makes firm electrical engagement with the negative terminal of battery 30. A second battery clip 80, shown in FIG. 5 is substantially identical to battery clip 78, and electrically engages the positive terminal of battery 28 and cooperates with the opposite end of conductive leaf-like spring 26 to retain battery 28 in electrical engagement with conductive members 80 and 26.

Turning again to a consideration of FIG. 8 and FIG. 5, it can be seen that contact portions 72d and 73d are arranged in substantially coplanar fashion and their surfaces are arranged in spaced parallel fashion relative to the confronting surface of contact portion 71e. Piston arm 55 is arranged to move between these contacts which serve to maintain piston arm 55 in its desired axial alignment as and when it experiences any movement in the axial direction as represented in FIG. 7 by arrows A and A', between contacts 71–73. In addition thereto, the contacts 71, 72 and 73 further serve as a means for establishing an electrical circuit in conjunction with the conductive washer 57. For example, when washer 57 electrically engages conductive portions 71e and 73d, and electrical path is established. Similarly, when conductive washer 57 electrically engages conductive surface 71e and 72d, a second electrical path is established, which electrical paths operate in a manner to be more fully described.

As was mentioned hereinabove, the electrical contact members 72 and 73 are adapted to be selectively electrically engaged by contact arm 61 of contact arm assembly 60 which contact arm 61 is provided with an enlarged end 61a having an opening 61b (FIGS. 6 and 6a). Enlarged end 61a tapers to a narrower end 61c whose elongated sides are bent upwardly at 61d and 61e to reinforce portion 61c of contact arm 61. The free end of contact arm 61 is provided with enlarged portion 62 which serves as a handle to facilitate manipulation of the switch arm 61 in order to select any of the three switch positions, as will be more fully described.

Contact arm 61 has an opening 61b which receives projection 13c-4, which is integrally formed upon projection 13c-3 which extends upwardly from and is integral with the interior surface of base portion 13c in the manner shown best in FIG. 6a. Conductive Bellville type washer 66 rests upon contact arm 61 and its central opening receives projecton 13c-4. Conductive eyelet 65, electrically connected to conductor 65a, also receives projection 13c-4. Fastener 64 threadedly engages opening 13c-4a in projection 13c-4 to urge eyelet 65 into an electrical circuit path with switch arm 61 by compressing washer 66 therebetween. Washer 66 wipingly engages members 61 and 65. Member 64 can be tightened without danger of overly compressing washer 66, due to projection 13c-4 and at the same time allows switch arm 61 to experience rotary motion about the fastening member 64.

As can be seen from FIGS. 6 and 6a, contact arm 61 is bent downwardly at 61c and is formed of a resilient material. Portion 61c-1 of contact arm 61 (FIG. 6a) cooperates with the U-shaped surfaces 13a-3 (FIG. 1) provided in slot 13a-2 and separated from intervening inverted substantially U-shaped projections to enable the contact arm 61 to remain in one of three possible switch positions, as will be more fully described in connection with FIG. 5.

As can best be seen from FIGS. 5 and 8, switch assembly 60, which is positioned with its pivot 64 arranged between portion 71a of contact 71 and 72b of contact 72, is electrically insulated from these contact members. The switch arm 61 is arranged to engage contact button 74 when in the solid line position 61 in FIG. 5. Similarly, contact arm 61 may be moved to the dotted line position 61' between contacts 72 and 73 and may further be moved to the dotted line position 61" where it elecrically engages contact button 76. Thus, switch arm 61 may occupy either of two vacuum sensing positions (solid line position 61 and dotted line position 61") and an off position (dotted line position 61').

Figure 5A:
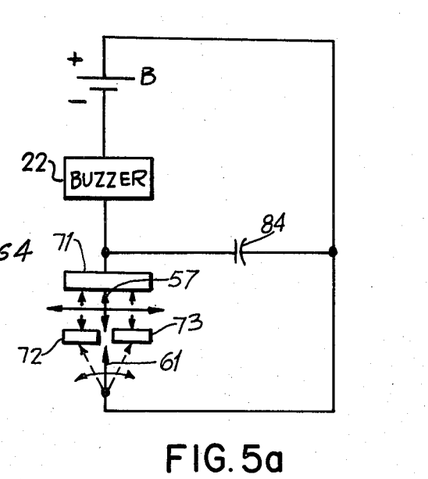
FIG. 5a shows a schematic diagram of the electrical circuit of FIG. 5.

A capacitor 84 has its terminals 84a, 84b electrically connected across switch arm assemblies 60 and 70, to buffer contact chattering of the contact assembly 70 which has a harmful effect upon the operation of buzzer 22 and thereby provide smooth buzzer operation. The simplified electrical circuit is shown best in FIG. 5a wherein the batteries 28 and 30 are represented by a battery symbol designated B, and the contact button or washer 57 is represented by a switch arm. As an alternative, the capacitor 84 may be placed in parallel with buzzer 22.

The operation of the apparatus 10 is as follows:

When the engine is operating and is idling or under a very small load, a vacuum condition (typically 17–20 inches of mercury when idling) is present, the precise magnitude of the vacuum condition being a function of the operating condition of the engine. The vacuum condition develops negative pressure within the piston chamber urging piston 51 in the direction shown by arrow A' (FIG. 7) against the force of spring 53. The amount of movement experienced by piston 51 and its piston rod 55, is a function of the spring force of spring 53 and the vacuum condition prevailing at that moment.

Depending upon the calibration of the vacuum sensing unit, piston 51 and piston rod 55 will experience movement sufficient to move piston rod 55 in the direction shown by arrow A' so that conductive washer 57 is displaced from all of the contacts 71, 72 and 73 and occupies the dotted line position 57' shown in FIG. 5 when the engine is idling or under a small or moderate load. The curved ends of contacts 71–73 smoothly guide the conductive washer 57 into and out of electrical engagement with the confronting flat surfaces of conductive portions 71e, 72d and 73d. At this time, the electrical path between contact 71 and either contact 72 or 73 is opened.

As the driver accelerates the engine, the vacuum level drops, allowing the spring 53 to move piston 51 and piston rod 55 in the direction of arrow A.

As can best be seen from a consideration of FIG. 5, washer 57 need be displaced only a small distance from position 57' in the direction of arrow A to position 57" to establish an electrical circuit path between conductive portion 71e and 72d through conductive washer 57 to indicate a reduction in vacuum level. This position senses operation of the vehicle out of the most economic operating range.

In the event that it is desired to actuate the alarm only in the event that a slightly less efficient operating range has been exceeded, switch arm 60 may be moved to the dotted line position 61" engaging contact button 76. Thus, even though the drop in the vacuum causes conductive washer 57 to move to position 57" to establish an electrical path between conductive portions 71e and 73d, no closed loop electrical circuit is established at this time. However, if it is desired to sense the smaller vacuum condition with switch arm 61 engaging contact button 76, when washer 57 moves to position 57''' in electrical engagement with conductive portions 71e and 73d, an electric path from contact 72 through switch arm 61 to buzzer 22 is completed. This arrangement establishes a closed loop electrical path causing buzzer 22 to be energized.

If the driver is accelerating when switch arm 61 is in the dotted line position 61'' and conductive washer 57 is in the dotted line position 57''', in order to automatically disable the alarm, the driver may open the throttle still further to cause a further drop in the vacuum and move the washer 57 to dotted line position 57'''' out of engagement with all of the contacts 71–73. By easing off on the throttle, the washer 57 may be returned to any one of the positions 57''', 57'' or 57'. By rapidly easing off the throttle, the washer 57 may promptly be moved from position 57'''' to position 57'.

In the event that it is desired to place the unit in the off condition, switch arm 61 is moved to the dotted line position 61' shown in FIG. 5, whereby switch arm 60 assumes a mid-position between electrical contacts 72 and 73. Thus, regardless of the electrical bridging path established by conductive washer 57 with contact 71 and either contact 72 or 73, no closed loop electrical circuit can be established thereby preventing buzzer 22 from being energized. The exterior surface of sidewall 13a may be provided with the designations "NORMAL", "OFF" and "MAXIMUM" designations to indicate the NORMAL economy, OFF, and MAXIMUM economy operating positions respectively.

These positions allow the operator to choose the efficiency level which the driver may wish to strive for when operating the vehicle to suit the particular needs of the driver. When one of the operating positions is selected and the buzzer is energized, the driver need only ease up on the throttle until the buzzer stops ringing. The buzzer 22 is also automatically disabled when the engine is shut off without placing switch arm 61 in the OFF position since the washer 57 will rapidly move to position 57'''' which indicates very low and hence a zero vacuum level.

Helical spring 53 shown in FIG. 7 has a predetermined spring constant which is chosen commensurate with the vacuum sensing device 50 to provide the two desired operating positions. In order to more accurately calibrate the vacuum sensing assembly to be assured that the desired levels are obtained, box-like container 90 is mounted within the region shown in housing half 13 and is free to experience movement therein. A test vacuum source is coupled to connecting nozzle 56 and is adjusted to provide a vacuum condition sufficient to move conductive washer 57 so that it just engages contacts 71 and 72 in the region of curved ends 71f and 72e. Thus, the box-like member 90 is moved either in the direction shown in arrow A or arrow A' to be assured that conductive end cap 57 occupies the desired position. Once the box-like member 90 is properly positioned, a glue or epoxy is applied to box-like member 90 and housing half 13 at any suitable location in order to maintain box-like member 90 in calibrated position.

Although the present invention teaches two economy positions, a greater or lesser number may be provided if desired. For example, either of the two contacts 72 or 73 may be omitted if one active switch position is sufficient. Alternatively, if more than two switch positions are desired, contact 71e may be lengthened and additional contacts may be aligned with contact portions 72d and 73d which, of course, may also be lengthened or shortened depending upon the particular vacuum condition for which it is desired to provide signals.

The conductive bridging member 57 need not be mounted at the end of piston rod 55 and alternatively may be mounted at a predetermined location along said piston rod and spaced inwardly from the end thereof. Also the washer 57 may be formed of an insulating material and one stationary contact may be modified in the manner shown in FIG. 8a where modified contact 73' has an integral bridging portion 73g' with a downwardly bent free end 73h' which engages contact portion 71e when the increased diameter washer portion 57 moves between contact surfaces 73b' and 71e. Contact 72 may be designed in the same manner as contact 73'.

The unit is designed so as to be operative using either DC battery power or, if desired, the power may be taken from the DC power available within the automobile in the event it is preferred to utilize local power and thereby eliminate the batteries 28 and 30.

Figure 9:
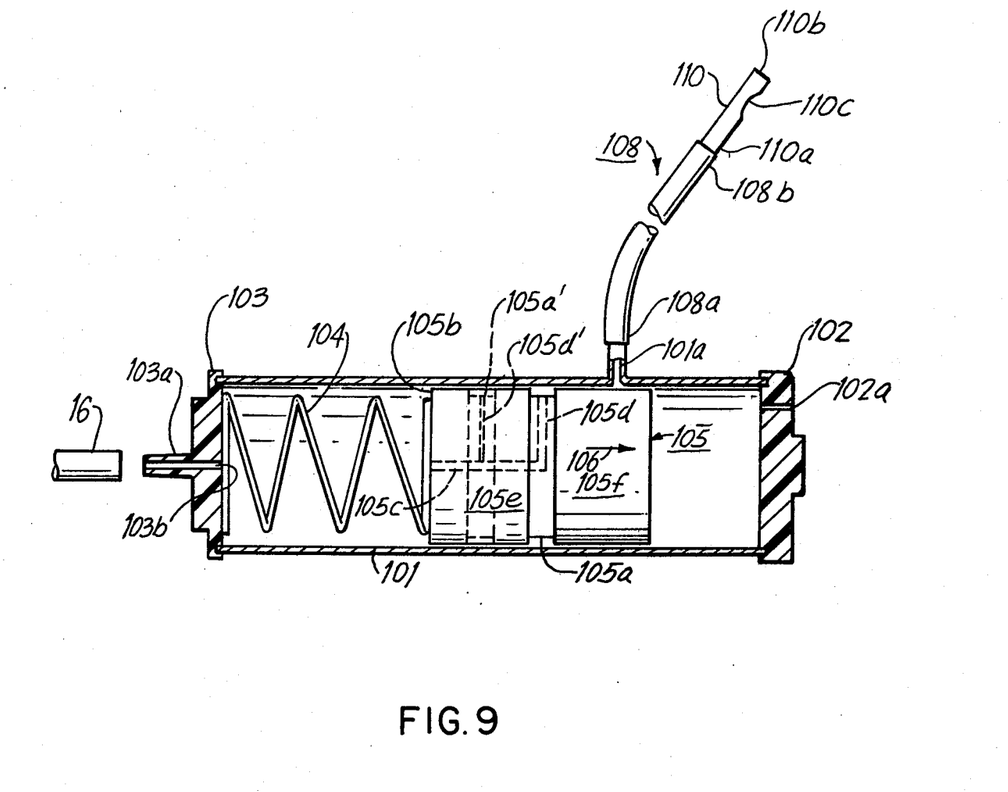
FIG. 9 shows a simplified view of an alternative embodiment of the present invention.

FIG. 9 shows an alternative embodiment 100 of the present invention which is comprised of a piston cylinder 101 sealed at one end by end cap 102 having opening 102a. The opposite end is sealed by end cap 103 having a nozzle 103a with a central opening 103b communicating with the interior of cylinder 101. Nozzle 103a is adapted to be coupled to one end of connecting hose 16 in a manner similar to nozzle 56 shown in FIG. 1.

A piston 105 is mounted for reciprocal movement in cylinder 101. Spring 104 is arranged between end cap 103 and one end of piston 105 and normally urges piston 105 in the direction of arrow 106.

Piston 105 is provided with an annular recess 105a. An axially aligned bore 105c extends into piston 105 from end surface 105b. A radially aligned bore 105d communicates with bore 105c and terminates in recess 105a. Piston 105 fits within cylinder 101 so that the gap therebetween is minimal in order to minimize vacuum loss and yet provide free sliding movement of piston 105. The cylindrical surfaces 105e and 105f are coated with a material having a very low coefficient of sliding friction, such as TEFLON (tetrafluoroethylene).

Cylinder 101 is provided with a hollow projection 101a communicating with the interior of cylinder 101. A flexible tube 108 has one end 108a force-fitted upon projection 101a.

The opposite end 108b of tube 108 is force-fitted to one end 110a of an air operated audible alarm member 110 whose opposite end is open to the atmosphere. The audible alarm 110 is preferably an air operated vibrating reed type alarm having a reed element (not shown) mounted within substantially hollow member 110. An opening 110c along the side of member 110 allows the sound developed by the reed member to escape into the atmosphere.

In operation, spring 104 normally urges piston 105 toward engagement with end cap 102 when the vacuum level is zero. When the engine is on and idling, piston 105 moves to the left so that recess 105a is displaced from and to the left of hollow projection 101a, to indicate a high vacuum level. When the vacuum drops spring 104 urges piston to the right. When recess 105a moves into substantial alignment with hollow projection 101a the vacuum in tube 16 extends through nozzle opening 103b, the interior of cylinder 101, bore 105c, bore 105d, recess 105a, hollow projection 101a and tube 108 to audible alarm 110.

As an automatic override, when recess 105a is displaced to the right of hollow projection 101a, the audible alarm is shut off.

By providing another recess 105a' and a radial aligned bore 105d', the unit may be provided with two economy levels as per the embodiment of FIGS. 2 and 3. By making bore 105d' smaller in diameter than bore 105d, a differentiation between the audible alarms is provided.

A latitude of modification, change and substitution is intended in the foregoing disclosure and, in some instances, some features of the invention will be employed without a corresponding use of other features. Accordingly, it is intended that the appended claims be construed broadly in a manner consistent with the spirit and scope of the invention herein.

What is claimed is:

1. Compact, self-contained vacuum gauge apparatus, comprising:
a housing, said housing containing:
vacuum sensing means including a reciprocating member, said vacuum sensing means having a coupling for connection with a source whose vacuum condition is to be measured;
said reciprocating member having an arm projecting from said vacuum sensing means;
an electrical circuit including first and second resilient flexible contacts slidably engaging said arm and maintaining and guiding said arm for movement along said path coincident with the longitudinal axis of said arm;
audible alarm means;
a battery;
said arm including a rigid contact for completing a conductive path between said first and second contacts for electrically coupling said audible alarm means to said battery when said rigid contact engages said first and second contacts; and
an elongated flexible conduit for connection between said coupling and the source to permit monitoring of the vacuum condition at a location remote from said source.

2. The apparatus of claim 1 further comprising:
means in said housing for releasable positioning and electrically connecting said battery to said first and second contacts.

3. The apparatus of claim 1 wherein each of said first and second contacts have elongated substantially flat surface portions slidably engaging said elongated rod; the free ends of said contacts being bent into a curved configuration to facilitate movement of the contact establishing means on said reciprocating member into and out of engagement with said first and second contacts.

4. The apparatus of claim 1 wherein said rigid contact comprises a conductive washer secured to one end of said reciprocating member.

5. The apparatus of claim 1, wherein one of said first and second contacts is electrically connected to said power source and the remaining one of said first and second contacts is electrically connected to said alarm means.

6. The apparatus of claim 1 wherein said first and second contacts are normally biased to be displaced from one another and engage one another when said contact establishing means engages said first and second contacts.

7. The apparatus of claim 1 wherein said reciprocating member comprises:
a piston mounted within an enclosure having an inlet opening;
biasing means for urging said piston in a first direction; and
the coupling of said vacuum sensing means introducing the vacuum condition whereby the vacuum condition present operates to move said piston against the force of said biasing means, said biasing means normally urging said piston in a first direction and said vacuum condition urging said piston in a second direction opposite said first direction when the force exerted by the vacuum condition upon said piston exceeds the force exerted upon the piston by said bias means.

8. The apparatus of claim 1 wherein said contact establishing means disconnects said power source from said audible alarm means when the device being monitored is turned off or is operating and is operating at or near no load.

9. The apparatus of claim 1 wherein at least one of said contacts disconnects said power source from said audible alarm means when the device being monitored is turned off or is operating and is operating at or near no load.

10. The apparatus of claim 1 wherein said electrical circuit further comprises at least a third flexible resilient contact arranged in coplanar fashion with one of said first and second contacts and cooperating with said first and second contacts to maintain said arm in the aforesaid axial alignment; and
said rigid contact being adapted to establish a second electrical path between said third contact and one of first and second contacts for coupling said alarm means to said battery when a second vacuum condition is present.

11. The apparatus of claim 2, wherein said electrical circuit comprises switch means having switch positions for selectively removing one of said first, second and third contacts from said electrical circuit, enabling an operator to choose the particular vacuum condition to be monitored.

12. The apparatus of claim 10 wherein one of said first and second contacts is electrically connected to said power source; and
said switch means being adapted to electrically connect said alarm means to the remaining one of said first and second contacts depending upon the positioning of said switch means.

13. The apparatus of claim 12 wherein said housing is provided with an opening, one edge of said opening having an undulating pattern; and
said switch means including a pivotally mounted switch arm, the free end of said switch arm extending through said opening and being biased towards the edge of said slot having said undulating pattern whereby to maintain the switch arm in a particular switch position.

14. The apparatus of claim 1, wherein said audible alarm comprises a buzzer.

15. The apparatus of claim 14, further comprising capacitor means coupled across said first and second contacts for reducing the effect of contact bounce of said first and second contacts upon the operation of said buzzer.

16. The apparatus of claim 1 wherein said vacuum sensing means comprises a housing:
piston means mounted within said housing;
biasing means for urging said piston means in a first direction;

coupling means for connecting said housing to said device for monitoring the vacuum condition whereby the vacuum condition present operates against said biasing means, said biasing means normally urging said piston means in a first direction and said vacuum condition urging said piston means in a direction reverse said first direction when the force exerted by the vacuum condition upon said piston means exceeds the force exerted upon the piston means by said bias means; and said reciprocating member being connected to said piston means.

17. The apparatus of claim 16 further comprising means in said housing for allowing said vacuum sensing means housing to be movably positioned within said housing to facilitate initial calibration of the vacuum sensing means and thereby assure proper positioning of the contact establishing means on said reciprocating member relative to said first and second contacts to effect the desired calibration; and securement means for securing said movable means to said housing upon completion of said calibration.

18. The apparatus of claim 17, wherein said securement means comprises a suitable epoxy.

* * * * *